(12) United States Patent
Wang et al.

(10) Patent No.: US 8,885,521 B2
(45) Date of Patent: Nov. 11, 2014

(54) TOPOLOGY MANAGEMENT METHOD OF ETHER MULTI-RING NETWORK, AND SYSTEM THEREOF

(75) Inventors: Bin Wang, Shenzhen (CN); Shaoyong Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 209 days.

(21) Appl. No.: 13/500,912

(22) PCT Filed: Dec. 10, 2009

(86) PCT No.: PCT/CN2009/075471
§ 371 (c)(1),
(2), (4) Date: Apr. 8, 2012

(87) PCT Pub. No.: WO2010/145131
PCT Pub. Date: Dec. 23, 2010

(65) Prior Publication Data
US 2012/0195233 A1      Aug. 2, 2012

(30) Foreign Application Priority Data

Oct. 19, 2009    (CN) .......................... 2009 1 0204363

(51) Int. Cl.
| | | |
|---|---|---|
| H04L 12/28 | (2006.01) | |
| H04L 12/24 | (2006.01) | |
| H04L 12/437 | (2006.01) | |

(52) U.S. Cl.
CPC .............. *H04L 41/12* (2013.01); *H04L 12/437* (2013.01)
USPC ............ 370/258; 370/406; 370/223; 370/217

(58) Field of Classification Search
CPC . H04L 12/437; H04L 43/0811; H04L 41/069; H04L 12/423; H04L 45/18; H04L 41/12; H04L 12/4641
USPC .............. 370/258, 222, 254, 229, 236.2, 225, 370/223, 217, 406, 400, 401, 449, 452
See application file for complete search history.

(56) References Cited

U.S. PATENT DOCUMENTS

2010/0110881 A1* 5/2010 Ryoo et al. ..................... 370/225
2010/0165883 A1* 7/2010 Holness et al. ............... 370/255

FOREIGN PATENT DOCUMENTS

| CN | 1547359 A | 11/2004 |
|---|---|---|
| CN | 101141404 A | 3/2008 |

(Continued)

OTHER PUBLICATIONS

ITU-T G.8032/Y.1344, Ethernet Ring Protection Switching, Jun. 2008.*

(Continued)

*Primary Examiner* — Bob Phunkulh
*Assistant Examiner* — Rose Clark
(74) *Attorney, Agent, or Firm* — Ling Wu; Stephen Yang; Ling and Yang Intellectual Property

(57) ABSTRACT

A method for managing a topology of a multi-ring Ethernet and a system thereof are disclosed, and the method includes: a node including a blocked port on the multi-ring Ethernet periodically sending a Topology Find Frame (TF) message along a transmission control channel through an own good port; a node receiving said TF message in the multi-ring Ethernet updating an own topology database according the NODE_LIST in said TF message, writing an own NODE_ID into the NODE_LIST of said TF message, and then forwarding said TF message along the transmission control channel.

12 Claims, 6 Drawing Sheets

(56) References Cited

FOREIGN PATENT DOCUMENTS

| | | |
|---|---|---|
| CN | 101183982 A | 5/2008 |
| EP | 1575221 A1 | 9/2005 |
| EP | 2051447 A1 | 4/2009 |
| WO | 2009087557 A1 | 7/2009 |

OTHER PUBLICATIONS

J. Ryoo et al "Ethernet Ring Protection for Carrier Ethernet Networks," IEEE Comm. Mag., vol. 46, No. 9, Sep. 2008, pp. 136-143.*
International Search Report for PCT/CN2009/075471 dated Jul. 8, 2010.

* cited by examiner

TOPOLOGY MANAGEMENT METHOD OF ETHER MULTI-RING NETWORK, AND SYSTEM THEREOF

TECHNICAL FIELD

The present invention relates to the multi-ring Ethernet protection technique in data communications, and in particular, to a method and a system for managing a topology of a multi-ring Ethernet.

BACKGROUND OF THE RELATED ART

With the development of the Ethernet towards the multi-service bearer, and particularly, higher and higher requirements on the reliability and the real-time of the network from a plurality of services, the Ethernet widely uses the ring networking so as to improve the reliability. During the protection in the ring network, fast protection switch is generally required, and the time of the protection switch should be below 50 ms. Currently, this kind of fast protection switch techniques includes RFC3619 of the Internet Engineering Task Force (IETF), G.8032 of the International Telecommunication Union, and so on.

The existing multi-ring Ethernet is as shown in FIG. 1, wherein nodes S1 to S6 are all Ethernet switching devices, the network B and the node S2 are connected, the network A and the node S5 are connected, and there are four physical paths for communicating between the network A and the network B, including: the network A←→the node S5←→the node S3←→the node S2←→the network B, the network A←→the node S5←→the node S3←→the node S4←→the node S1←→the node S2←→the network B, the network A←→the node S5←→the node S6←→the node S4←→the node S3←→the node S2←→the network B, and the network A←→the node S5←→the node S6←→the node S4←→the node S1←→the node S2←→the network B.

When applying the protection technique of the multi-ring Ethernet, a Ring and a Sub-Ring are usually used, wherein a Ring is a complete Ethernet ring, and a Sub-Ring is an Ethernet ring connected with other rings or networks through an Interconnection Node. The Interconnection Node is a common node simultaneously belonging to two or more Ethernet rings, and the Interconnection Node also can be called as a shared node. As shown in FIG. 2, it includes one Ring and one Sub-Ring, wherein Ring1 is the Ring, and Ring2 is the Sub-Ring. Ring1 includes nodes S1, S2, S3 and S4, and includes links <S1, S2>, <S2, S3>, <S3, S4> and <S4, S1>; Ring2 includes nodes S3, S5, S6 and S4, and includes links <S3, S5>, <S5, S6>, and <S6, S4>. It should be emphasized that the link <S3, S4> belongs to Ring1 rather than Ring2. Nodes S3 and S4 are the interconnection nodes of Ring1 and Ring2. The 33 port of the node S3 and the 43 port of the node S4 belong to Ring2, which are called as access ports.

In the case there is no failure in the ring network, a path, which is called as a ring protection link or constantly blocked path, is needed to block the forwarding of data message to prevent ring formation, and the switch between the primary path and the protection path is participated through the ring protection link in the ring. The node owning the ring protection link is called as a ring protection link control node. As shown in FIG. 2, in Ring 1, node S4 is the ring protection link control node, and the link directly connected to port 41 of the node S4 is the ring protection link of Ring 1. In Ring 2, node S5 is the ring protection link control node, and the link directly connected to port 52 of the node S5 is the ring protection link of Ring 2.

When links of the multi-ring Ethernet are all in a good condition, i.e., links are in a normal state, the ring protection link control nodes of the Ring and Sub-Ring block protection data forwarding function of the their secondary ports to prevent the protection data from being repeatedly forwarded and forming broadcasting storm. As shown in FIG. 2, the node S4 in Ring1 blocks the protection data forwarding function of the port 41, the node S5 in Ring2 blocks the protection data forwarding function of the port 52, and the communication path between the network B and the network A is the network B←→the node S2←→the node S3←→the node S5←→the network A.

When a failure occurs in the link of the multi-ring Ethernet, and if the failure link is not the protection link, then the ring protection link control node opens the protection data forwarding function of the secondary port, and each node should update the address forwarding table, and the communication between networks is transmitted based on the new path. As shown in FIG. 3, a failure occurs in the link <S2, S3> of Ring1; nodes S2 and S3 respectively block the data forwarding functions of ports 22 and 31 after detecting the link failure, and notify other nodes that the failure occurs in the link; the node S4 is a ring protection link control node, and the node S4 opens the protection data forwarding function of the port 41 after receiving the failure notification; besides, each node on Ring1 should also update the address forwarding table, and the new communication path between the network B and the network A is the network B←→the node S2←→the node S1←→the node S4←→the node S3←→the node S5←→the network A.

When the link of the multi-ring Ethernet recovers, the recovering switch is performed, and the network transmission recovers to the transmission path of the normal state. Since the path changes, the nodes also needs to update the address forwarding table.

Although the related art solves the protection problem of the multi-ring Ethernet very well, there still lacks a method for effectively managing the topology of the multi-ring Ethernet, used for discovering information of the node locations, topology statuses, whether the path can be reached and so on in the whole multi-ring Ethernet.

SUMMARY OF THE INVENTION

In view of this, the main object of the present invention is to provide a method and a system for managing a topology of a multi-ring Ethernet, so as to implement the topology management of the multi-ring Ethernet.

In order to achieve the above object, the technical scheme of the present invention can be implemented as follows.

A method for managing a topology of a multi-ring Ethernet comprises:

a node including a blocked port on the multi-ring Ethernet periodically sending a Topology Find Frame (TF) message along a transmission control channel through an own good port, and if the port sending the TF message is not the blocked port, then said node writing an own Node Identifier (NODE_ID) into a Node identifier List (NODE_LIST) of the TF message; if the port sending the TF message is the blocked port, then said node not writing the own NODE_ID into the NODE_LIST of the TF message;

a node receiving said TF message in the multi-ring Ethernet updating an own topology database according to the NODE_LIST in said TF message, writing an own NODE_ID into the NODE_LIST of said TF message, and then forwarding said TF message along the transmission control channel.

The method further comprises: said node sending the TF message writing the own NODE_ID into a NODE_ID field of the TF message, and writing an own included blocked port identifier (PID) into a PID field of the TF message.

The method further comprises:

after receiving said TF message, said node receiving the TF message judging whether the TF message is received from an own blocked port, and if yes, discarding said TF message; otherwise, comparing the NODE_ID and PID in said TF message with NODE_IDs and PIDs in an own setΩ, and if identical NODE_ID and PID exist in the set, writing the own NODE_ID into the NODE_LIST of said TF message, and then forwarding said TF message along the transmission control channel; if no identical NODE_ID and PID exist, writing the NODE_ID and PID in said TF message into the own setΩ, updating the own top ology database according to the NODE_LIST in said TF message, writing the own NODE_ID into the NODE_LIST of said TF message, and then forwarding said TF message along the transmission control channel. Said updating the own topology database according to the NODE_LIST in said TF message comprises:

the node receiving the TF message performing maximum path match on the NODE_LIST in said TF message to a topology data structure corresponding to the port receiving said TF message;

if no maximum match path is found, writing information of the NODE_LIST of said TF message into the topology data structure corresponding to the port receiving the TF message;

if the maximum match path is found and a number of nodes on said maximum match path is less than a number of nodes of the NODE_LIST in the TF message, writing information of the NODE_LIST of said TF message into the topology data structure corresponding to the port receiving the TF message, and covering the maximum match path;

if the maximum match path is found and the number of nodes on said maximum match path is equal to the number of nodes of the NODE_LIST in the TF message, searching a NODE_ID which has a furthest distance with said port in said NODE_LIST, and deleting all NODE_IDs located behind the searched NODE_ID in a topology including said maximum match path in the topology data structure corresponding to the port.

A direction of deleting the NODE_IDs is a direction from the node which has the furthest distance to the port to a node identified by the PID field in said TF message.

A system for managing a topology of a multi-ring Ethernet comprises a sending node and a receiving node in the multi-ring Ethernet, wherein:

said sending node including a blocked port, and is configured to periodically send a TF message along a transmission control channel through an own good port, and if the port sending the TF message is not the blocked port, then said sending node writes an own NODE_ID into a NODE_LIST of the TF message; if the port sending the TF message is the blocked port, then said sending node does not write the own NODE_ID into the NODE_LIST of the TF message;

said receiving node is configured to receive said TF message, to update an own topology database according to the NODE_LIST in said TF message, to write an own NODE_ID into the NODE_LIST of said TF message, and then to forward said TF message along the transmission control channel.

Said sending node is further configured to: write the own NODE_ID into a NODE_ID field of the TF message, and write an own included PID into a PID field of the TF message.

Said receiving node is further configured to: judge whether the TF message is received from an own blocked port after receiving said TF message, and if yes, discard said TF message; otherwise, compare the NODE_ID and PID in said TF message with NODE_IDs and PIDs in an own setΩ, and if identical NODE_ID and PID exist in the set, write the own NODE_ID into the NODE_LIST of said TF message, and then forward said TF message along the transmission control channel; if no identical NODE_ID and PID exist, write the NODE_ID and PID in said TF message into the own set Ω, update the own topology database according to the NODE_LIST in said TF message, write the own NODE_ID into the NODE_LIST of said TF message, and then forward said TF message along the transmission control channel.

Said receiving node is further configured to: perform maximum path match on the NODE_LIST in said TF message to a topology data structure corresponding to the port receiving said TF message;

if no maximum match path is found, write information of the NODE_LIST of said TF message into the topology data structure corresponding to the port receiving the TF message;

if the maximum match path is found and a number of nodes on said maximum match path is less than a number of nodes of the NODE_LIST in the TF message, write information of the NODE_LIST of said TF message into the topology data structure corresponding to the port receiving the TF message, and cover the maximum match path;

if the maximum match path is found and the number of nodes on said maximum match path is equal to the number of nodes of the NODE_LIST in the TF message, search a NODE_ID which has a furthest distance with said port in said NODE_LIST, and delete all NODE_IDs located behind the searched NODE_ID in a topology including said maximum match path in the topology data structure corresponding to the port.

A direction of the receiving node deleting the NODE_IDs is a direction from the node which has the furthest distance to the port to a node identified by the PID field in said TF message.

In the method and system for managing a topology of a multi-ring Ethernet provided by the present invention, the node including a blocked port in the multi-ring Ethernet periodically sends a topology find frame (TF) message through its own good port along the transmission control channel; the node receiving the TF message on the multi-ring Ethernet updates its own topology database according to the node identifier list (NODE_LIST) in the TF message, and forwards the TF message along the transmission control channel after writing its own node identifier (NODE_ID) into the NODE_LIST of the TF message. With the method and system of the present invention, the topology management of the multi-ring Ethernet is implemented, the information of the node locations, topology statuses, whether the path can be reached, and so on of the whole multi-ring Ethernet can be found, and the manageability of the multi-ring Ethernet is improved.

PREFERRED EMBODIMENTS OF THE PRESENT INVENTION

Below the technical scheme of the present invention is further described in detail with reference to the figures and particular examples.

In order to implement the topology management of the multi-carrier Ethernet, the present invention provides a method for managing a topology of a multi-ring Ethernet, of which the core idea is that the multi-ring Ethernet configures the transmission control channel in the whole network for the Topology Find Frame (TF) to make the TF message able to be transmitted in the whole multi-ring Ethernet; the node including a blocked port in the multi-ring Ethernet periodically sends the TF message through its own good port along the transmission control channel, and if the port sending the TF message is not a blocked port, then this node writes its own node identifier (NODE_ID) into the node identifier list (NODE_LIST) of the TF message; if the port sending the TF message is a blocked port, then this node does not write its own NODE_ID into the NODE_LIST of the TF message; the node receiving the TF message in the multi-ring Ethernet updates its own topology database according to the NODE_LIST in the TF message, and forwards the TF message along the transmission control channel after writing its own NODE_ID into the NODE_LIST of the TF message.

Figure 1:
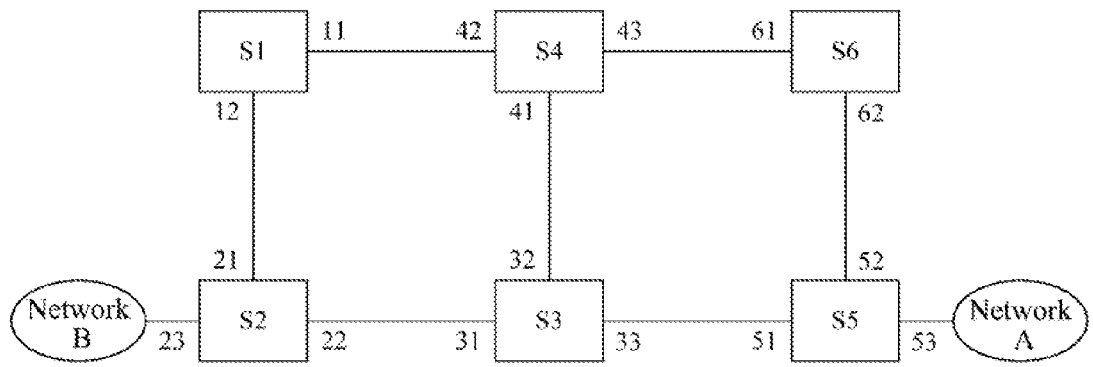
FIG. 1 is a structure diagram of the multi-ring Ethernet in the related art.
Figure 2:
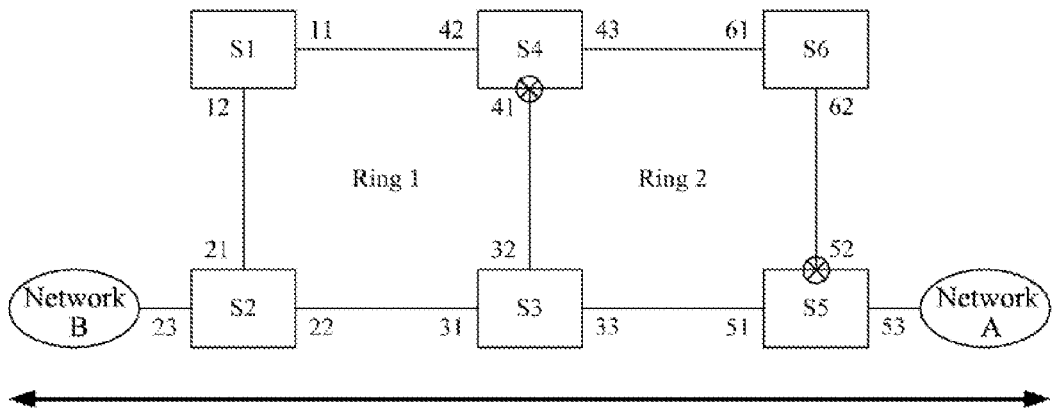
FIG. 2 is a schematic diagram of forwarding data in the case that the multi-ring Ethernet does not have a failure in the related art.
Figure 3:
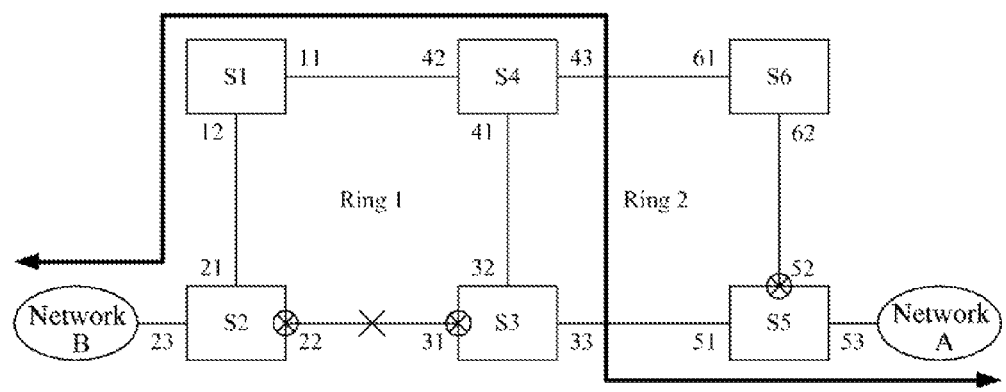
FIG. 3 is a schematic diagram of data stream protection switch in the case that a failure occurs in the multi-ring Ethernet in the related art.
Figure 4:
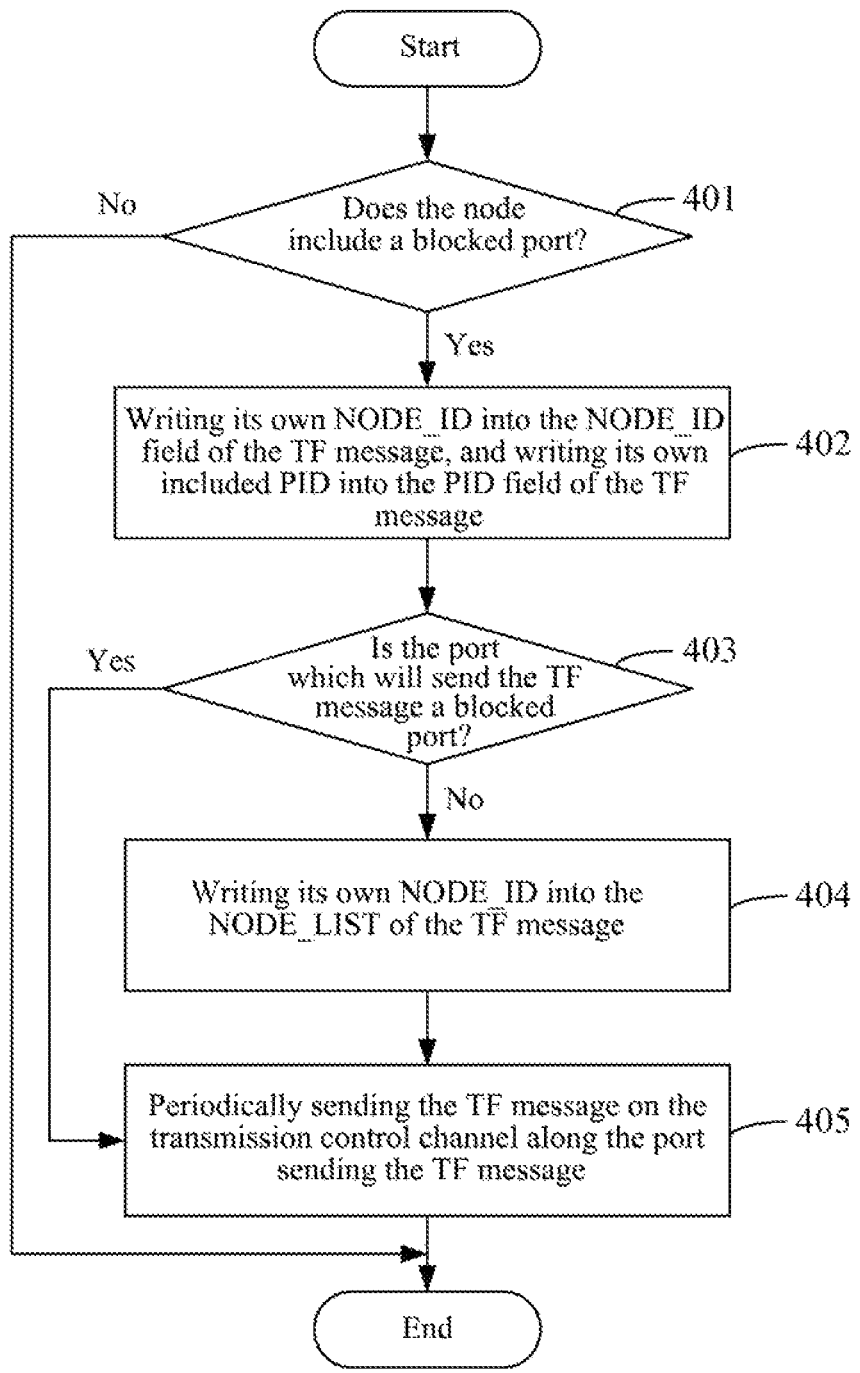
FIG. 4 is a flow chart of the operations implemented by the sending node of the TF message according to the present invention.

Based on the above idea, the operations implemented by a sending node of the TF message is first described in detail in the following. As shown in FIG. 4, the operations mainly comprise following steps.

In step 401, a node judges whether the node itself includes a blocked node in a ring or a sub-ring, and if yes, step 402 is performed; if not, the whole procedure ends.

In step 402, this node writes its own NODE_ID into the NODE_ID field of the TF message, and writes own included blocked port identifier (PID, Port ID) into the PID field of the TF message.

The PID field is used for storing the identifier of the blocked port of the node on the ring or sub-ring, and the PID of the present invention is represented by the identifier of another node of the link connected with this blocked port, and the reason will be described later.

In step 403, this node judges whether the port which should send the TF message is a blocked port or not, and if yes, step 405 is performed; otherwise, step 404 is performed.

In step 404, the node writes its own NODE_ID into the NODE_LIST of the TF message. Then Step 405 is performed.

In step 405, the node periodically sends the TF message on the transmission control channel along the port sending the TF port.

If the port sending the TF message is not the blocked port, the node writes its own NODE_ID into the NODE_LIST of the TF message; if the port sending the TF message is the blocked port, the node does not write its own NODE_ID into the NODE_LIST of the TF message.

Figure 5:
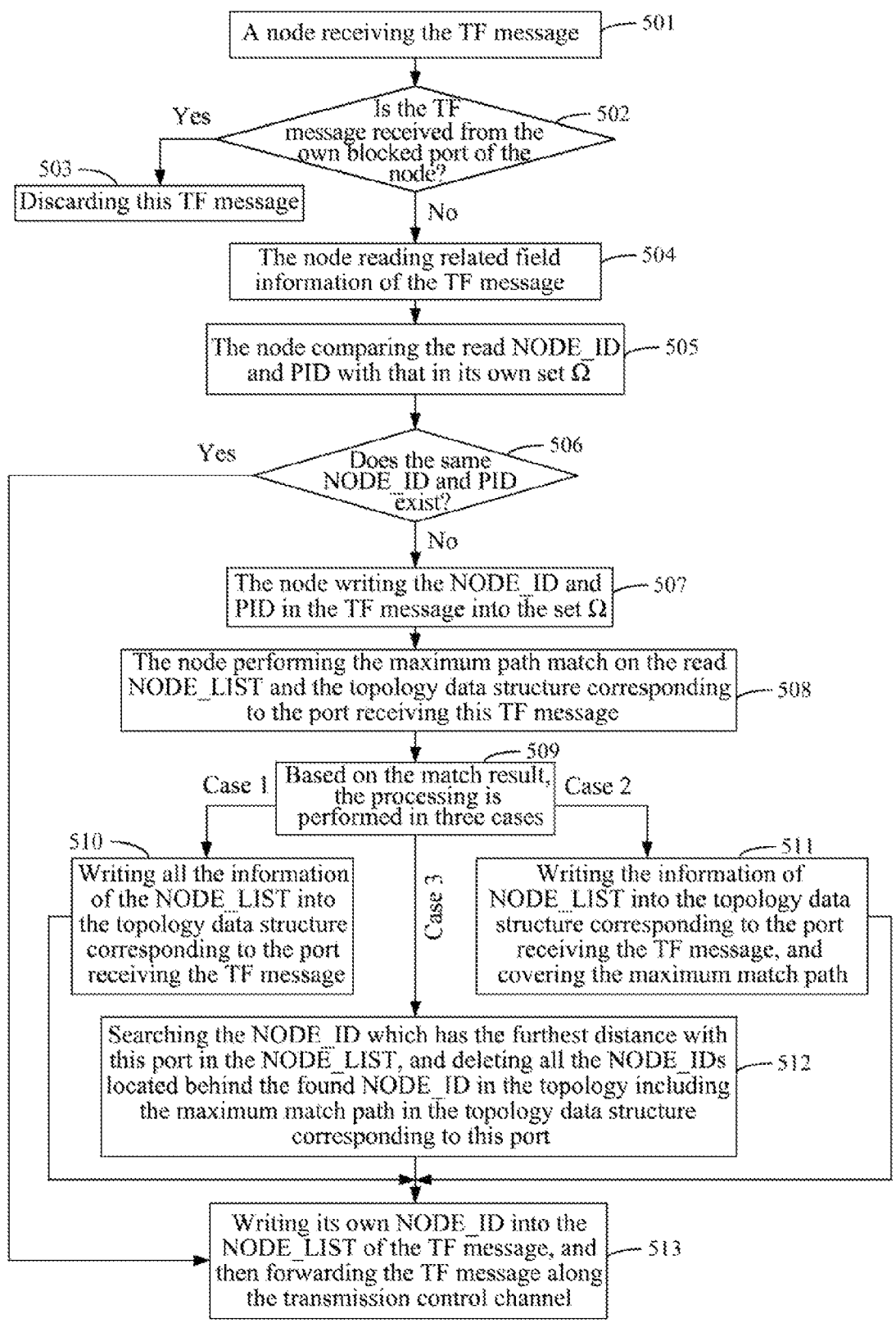
FIG. 5 is a flow chart of the operations implemented by the receiving node of the TF message according to the present invention.

Below the operation procedure implemented by the receiving node of the TF message is further described in detail, and as shown in FIG. 5, the procedure mainly comprises following steps.

In step 501, the node receives the TF message.

In step 502, it is judged whether the TF message is received from the own blocked port of the node, and if yes, step 503 is performed; otherwise, step 504 is performed.

Step 503, the node discards this TF message.

Step 504, the node reads the related field information including the NODE_ID, PID and NODE_LIST of the TF message.

In steps 505 to 506, the node compares the read NODE_ID and PID with that in its own set Ω, and judges whether identical NODE_ID and PID exist, and if exist, step 513 is performed; otherwise, step 507 is performed.

For the set Ω of the present invention, its elements are all stored in a form of the two-tuple (NODE_ID, PID). The set Ω is used for recording the information of the node sending the TF message in the multi-ring Ethernet, and the information includes NODE_ID and PID. The object of the node storing the set Ω is to prevent periodical TF message from repeatedly updating the topology database of the node.

In step 507, the node writes the NODE_ID and PID in the TF message into the set Ω, and the NODE_ID and PID are stored in a form of the two-tuple (NODE_ID, PID).

In step 508, the node performs the maximum path match on the read NODE_LIST to the topology data structure corresponding to the port receiving this TF message.

This topology data structure is generally stored in a form of a tree, and said maximum path match is to search for a path with the biggest number of nodes which are the same in the NODE_LIST and the tree.

In step 509, based on the match result, the processing is performed in following three cases.

In case 1, the maximum match path is not found, namely, the topology data structure corresponding to the port have no same node identifier as the NODE_LIST, and step 510 is performed.

In case 2, the maximum match path is found, and the number of nodes on the maximum match path is less than the number of nodes in the NODE_LIST, and step 511 is performed.

In case 3, the maximum match path is found, and the number of nodes on the maximum match path is equal to the number of nodes in the NODE_LIST, and step 512 is performed.

It should be noted that since the information in the NODE_LIST is added in sequence by the nodes the TF message passed, the present invention does not include the case that the number of nodes on the maximum match path is more than the number of nodes of the NODE_LIST.

In step 510, the node writes all the information of the NODE_LIST into the topology data structure corresponding to the port receiving the TF message, and then step 513 is performed.

In step 511, the node writes the information of NODE_LIST into the topology data structure corresponding to the port receiving the TF message, and covers the maximum match path, and then step 513 is performed.

In step 512, the node searches the NODE_ID which has the furthest distance with this port in the NODE_LIST, and deletes all the NODE_IDs located behind the found NODE_ID in the topology including the maximum match path in the topology data structure corresponding to this port, and then step 513 is performed.

The direction of deleting the NODE_IDs is a direction from the node which has the furthest distance to the port to a node identified by the PID field in said TF message. The particular deletion operation will be described in detail in subsequent examples.

In step 513, the node writes its own NODE_ID into the NODE_LIST of the TF message, and then forwards the TF message along the transmission control channel. The forwarding ports are other good ports except the port receiving this TF message.

Below the method for managing a topology of a multi-ring Ethernet will be further described in detail in combination with particular examples. First, the topology discovery in the case of a multi-ring Ethernet without a failure is described. In the example 1 shown in FIG. 6, Ring1 is a ring, including nodes S1, S2, S3, S4, S5 and S6, and links <S1, S2>, <S2, S3>, <S3, S4>, <S4, S5>, <S5, S6> and <S6, S1>. The ring protection link control node S1 blocks the data message forwarding function of port 11 in the case without a failure. Ring2 is a sub-ring, including nodes S2, S7, S8, S9 and S4 and links <S2, S7>, <S7, S8>, <S8, S9> and <S9, S4>. The ring protection link control node S8 blocks the data message forwarding function of port 82 in the case without a failure.

The node S1 in Ring1 periodically sends the TF1 message along the port 11 and periodically sends the TF2 message along the port 12. Since the port 11 of the node S1 is a blocked port, the node S1 does not write its own NODE_ID into the NODE_LIST of the TF1 message. But for the TF2 message, the node S1 writes its own NODE_ID into the NODE_LIST of the TF2 message.

The node S8 in Ring2 periodically sends the TF3 message along the port 82 and periodically sends the TF4 message along the port 82. Since the port 82 of the node S8 is a blocked port, the node S8 does not write its own NODE_ID into the NODE_LIST of the TF3 message. But for the TF4 message, the node S8 writes its own NODE_ID into the NODE_LIST of the TF4 message.

Nodes on the ring and sub-ring should update the topology after receiving the TF message. The following will only illustrates the node S1 processing the TF message which is taken as an example.

For the node S1, since its port 11 is a blocked port, the node S1 discards the received TF3, TF4 and TF2 messages, and the node S1 is only able to learn the topology information of the TF3, TF4 and TF2 messages from the port 12.

When the node S1 firstly receives the TF1 message and finds that the (NODE_ID, PID) in the TF1 message is different from all the elements in its own set Ω, the node S1 writes the topology information "S2-S3-S4-S5-S6" of the NODE_LIST in the TF1 message into the corresponding topology data structure corresponding to port 12, and adds the (NODE_ID, PID) in the TF1 message into the set Ω.

Hereinafter, when the node S1 receives the TF4 message and finds that the (NODE_ID, PID) in the TF4 message is different from all the elements in its own set Ω, the node S1 adds the (NODE_ID, PID) in the TF4 message into the set Ω; the node S1 performs the maximum path match on the topology information "S8-S7-S2" of the NODE_LIST in the TF4 message with the tree topology "S2-S3-S4-S5-S6" of the port 12, and obtains the maximum match path "S2" and knows that the number of nodes included in the NODE_LIST is more than that on the maximum match path, and therefore, the node S1 writes the topology information "S2-S7-S8" of the NODE_LIST into the topology data structure corresponding to the port 12, and the topology information "S2-S7-S8" covers the maximum match path "S2".

Finally, the node S1 further receives the TF3 message and finds that the (NODE_ID, PID) in the TF3 message is different from all the elements in its own set Ω, the node S1 adds the (NODE_ID, PID) in the TF3 message into the set Ω; the node S1 performs the maximum path match on the topology information "S2-S3-S4-S9" of the NODE_LIST of the TF3 message with the tree topology of the port 12, and obtains the maximum match path "S2-S3-S4" and knows that the number of nodes included in the NODE_LIST is more than that on the maximum match path, and therefore, the node S1 writes the topology information "S2-S3-S4-S9" of the NODE_LIST into the topology data structure corresponding to the port 12, and the topology information "S2-S3-S4-S9" covers the maximum match path "S2-S3-S4". So far, the topology information of the port 12 of the node S1 is established completely, and the topology information of the port 12 includes three paths "S2-S3-S4-S5-S6", "S2-S7-S8" and "S2-S3-S4-S9", which is represented in a form of the tree as follows.

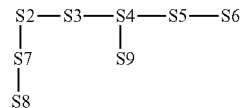

Based on the similar processing of the node S1:

the topology information of the port 21 of the node S2 includes the path "S1", the topology information of the port 22 includes the path "S7-S8", and the topology information of the port 23 includes the paths "S3-S4-S5-S6" and "S3-S4-S9";

the topology information of the port 31 of the node S3 includes the paths "S2-S1" and "S2-S7-S8", and the topology information of the port 32 includes the paths "S4-S5-S6" and "S4-S9";

the topology information of the port 41 of the node S4 includes the paths "S3-S2-S1" and "S3-S2-S7-S8", the topology information of the port 42 includes the path "S5-S6", and the topology information of the port 43 includes the path "S9";

the topology information of the port 51 of the node S5 includes the paths "S4-S3-S2-S1", "S4-S9" and "S4-S3-S2-S7-S8", and the topology information of the port 52 includes the path "S6";

the topology information of the port 61 of the node S6 includes the paths "S5-S4-S3-S2-S1", "S5-S4-S9" and "S5-S4-S3-S2-S7-S8", and the port 62 does not have the topology information;

the topology information of the port 71 of the node S7 includes the paths "S2-S1", "S2-S3-S4-S5-S6" and "S2-S3-S4-S9", and the topology information of the port 72 includes the path "S8";

the topology information of the port 81 of the node S8 includes the paths "S7-S2-S1", "S7-S2-S3-S4-S9" and "S7-S2-S3-S4-S5-S6", and the port 82 have no topology information;

the port 91 of the node S9 have no topology information, and the topology information of the port 92 includes the paths "S4-S3-S2-S1", "S4-S3-S2-S7-S8" and "S4-S5-S6".

Hereinafter, the topology discovery in the case of the multi-ring Ethernet with a sending failure is described. In the example 2 shown in FIG. 7, a failure occurring in the link <S2, S3> is detected by the nodes S2 and S3, nodes S2 and S3 respectively block the data message forwarding function of the ports 22 and 31, and the control node S1 opens the data message forwarding function of the port 11. The node S2 periodically sends the TF0 and TF1 messages along the ports 21 and 23 respectively, and the node S2 writes its own NODE_ID into the NODE_LIST of the TF0 and TF1 messages. The node S3 periodically sends the TF2 message along the port 32, and the node S3 writes its own NODE_ID into the NODE_LIST of the TF2 message.

The control node S8 of the sub-ring periodically sends the TF3 message along the port 82 and periodically sends the TF4 message along the port 81. Since the port 82 of the node S8 is a blocked port, the node S8 does not write its own NODE_ID into the NODE_LIST of the TF3 message. For the TF4 message, the node S8 writes its own NODE_ID into the NODE_LIST of the TF4 message.

Nodes on the ring and sub-ring should update the topology after receiving the TF message. The following will only illustrates the node 51 processing the TF message, which is taken as an example.

When the port 12 of the node 51 firstly receives the TF0 message and finds that the (NODE_ID, PID) in the TF0 message is different from all the elements in its own set Ω, the node S1 adds the (NODE_ID, PID) in the TF0 message into the set Ω; the node S1 performs the maximum path match on the topology information "S2" of the NODE_LIST of the TF0 message with the tree topology of the port 12 (see the tree topology of the port 12 in example 1), and obtains the maximum match path "S2" and knows that the number of nodes included in the NODE_LIST is equal to that on the maximum match path; therefore, the node 51 deletes all the nodes behind the node S2 in the direction of nodes S2→S3 in the topology information of the port 12, at this time, the topology information of port 12 of node S1 is changed to be "S2-S7-S8", wherein the direction of the nodes S2→S3 in the topology information of the port 12 is obtained according to the indication of the PID field of the TF0 message.

Hereinafter, when the port 12 of the node 51 further receives the TF4 message and finds that the (NODE_ID, PID) in the TF4 message is different from all the elements in its own set Ω, the node S1 adds the (NODE_ID, PID) in the TF4 message into the set Ω; the node S1 performs the maximum path match on the topology information "S2-S7-S8" of the NODE_LIST in the TF4 message with the topology information (it is "S2-S7-S8" currently) of the port 12, and obtains the maximum match path "S2-S7-S8" and knows that the number of nodes included in the NODE_LIST is equal to that on the maximum match path; and therefore, the node 51 deletes all the nodes behind the node S8 in the direction of the nodes S8→S9 in the topology information of the port 12 of the node 51. At this point, the topology information of the port 12 of the node 51 is still "S2-S7-S8", wherein the direction of the nodes S8→S9 in the topology information of the port 12 is obtained according to the indication of the PID field of the TF4 message.

The following will analyzes the processing of the port 11 on the TF3 and TF2 messages.

The port 11 of the node S1 first receives the TF3 message and finds that the (NODE_ID, PID) in the TF3 message is different from all the elements in its own set Ω, and the node S1 adds the (NODE_ID, PID) in the TF3 message into the set Ω; the node S1 performs the maximum path match on the topology information "S6-S5-S4-S9" of the NODE_LIST of the TF3 message with the tree topology of the port 11 (see the topology information of the port 11 in example 1, and the topology information is actually null), and no maximum match path is found, and the node S1 directly writes the "S6-S5-S4-S9" into the topology data structure corresponding to the port 11.

Subsequently, the port 11 of the node S1 further receives the TF2 message and finds that the (NODE_ID, PID) in the TF2 message is different from all the elements in its own set Ω, and the node S1 adds the (NODE_ID, PID) in the TF2 message into the set Ω; the node S1 performs the maximum path match on the topology information "S6-S5-S4-S3" of the NODE_LIST of the TF2 message with the topology information of the port 11 (it is "S6-S5-S4-S9" currently), and obtains that the maximum match path "S6-S5-S4" and knows that the number of nodes included in the NODE_LIST is more than that on the maximum match path. Therefore, the port 11 of the node S1 writes the topology information "S6-S5-S4-S3" of the NODE_LIST into the topology data structure corresponding to the port 11, and the topology information "S6-S5-S4-S3" covers the maximum match path "S6-S5-S4". So far, the topology information of the ports 11 and 12 of the node S1 is established completely, the topology information of the port 11 includes two paths "S6-S5-S4-S3" and "S6-S5-S4-S9", and the topology information of the port 12 includes the path "S2-S7-S8".

Based on the similar processing of the node S1:

the topology information of the port 21 of the node S2 includes the paths "S1-S6-S5-S4-S3" and "S1-S6-S5-S4-S9", the port 22 does not have the topology information, and the topology information of the port 23 includes the path "S7-S8";

the port 31 of the node S3 does not have the topology information, and the topology information of the port 32 includes the paths "S4-S5-S6-S1-S2-S7-S8" and "S4-S9";

the topology information of the port 41 of the node S4 includes the path "S3", the topology information of the port 42 includes the path "S5-S6-S1-S2-S7-S8", and the topology information of the port 43 includes the path "S9";

the topology information of the port 51 of the node S5 includes the paths "S4-S3" and "S4-S9", and the topology information of the port 52 includes the path "S6-S1-S2-S7-S8";

the topology information of the port 61 of the node S6 includes the paths "S5-S4-S3" and "S5-S4-S9", and the topology information of the port 62 includes the path "S1-S2-S7-S8";

the topology information of the port 71 of the node S7 includes the paths "S2-S1-S6-S5-S4-S3" and "S2-S1-S6-S5-S4-S9", and the topology information of the port 72 includes the path "S8";

the topology information of the port 81 of the node S8 includes the paths "S7-S2-S1-S6-S6-S4-S3" and "S7-S2-S1-S6-S5-S4-S9", and the port 82 does not have the topology information;

the port 91 of the node S9 does not have the topology information, and the topology information of the port 92 includes the paths "S4-S3" and "S4-S5-S6-S1-S2-S7-S8".

It should be particularly noted that the PID in the present invention is represented by the identifier of another node of the link connected with this blocked port, of which the advantage is embodied in the application scenario when the interconnection nodes includes the blocked port. With respect to the case of the interconnection node including the blocked port, if the PID in the TF message sent by the interconnection node is identified by the node where the blocked port is located instead of being identified by another node of the link connected with this blocked port, then when other nodes receive the TF message sent by the interconnection node including the blocked port and should execute the operation of the above step 512, the NODE_IDs on the connection branch of the blocked port of the interconnection node cannot be deleted correctly, that is, the NODE_ID of the connection branch of the unblocked port might be also deleted.

Figure 6:
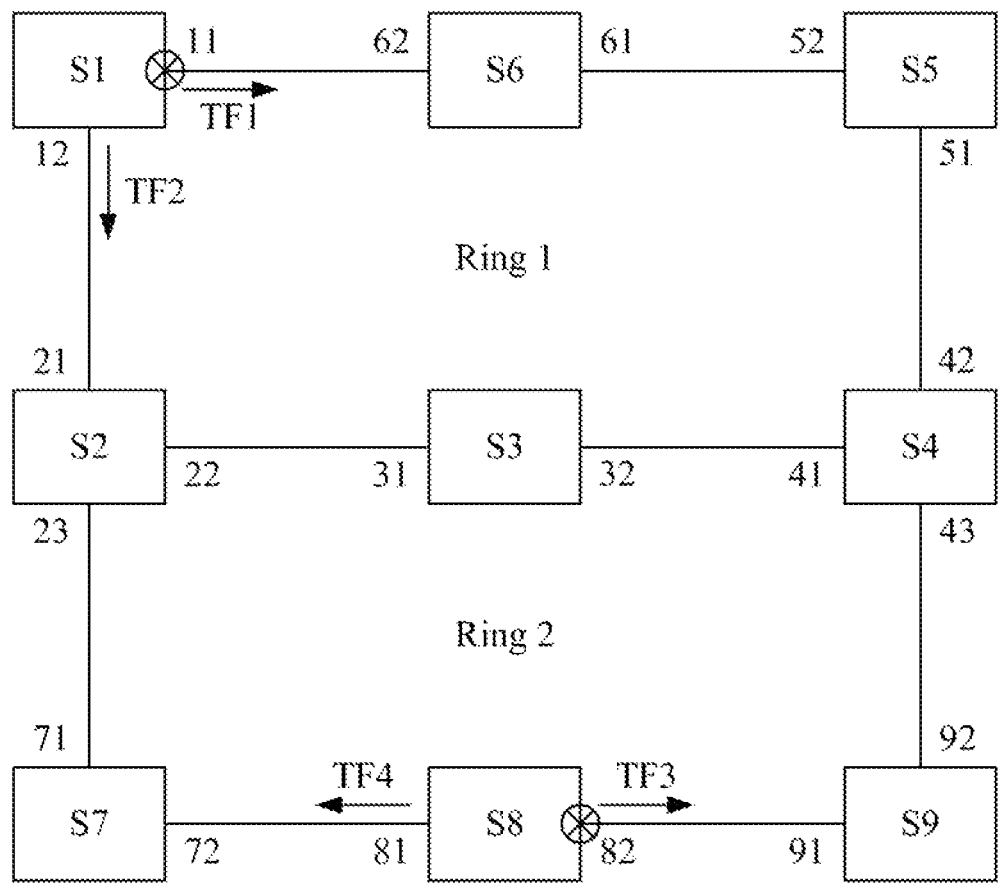
FIG. 6 is a schematic diagram of the topology discovery in the case that the multi-ring Ethernet does not have a failure according to the example of the present invention.
Figure 7:
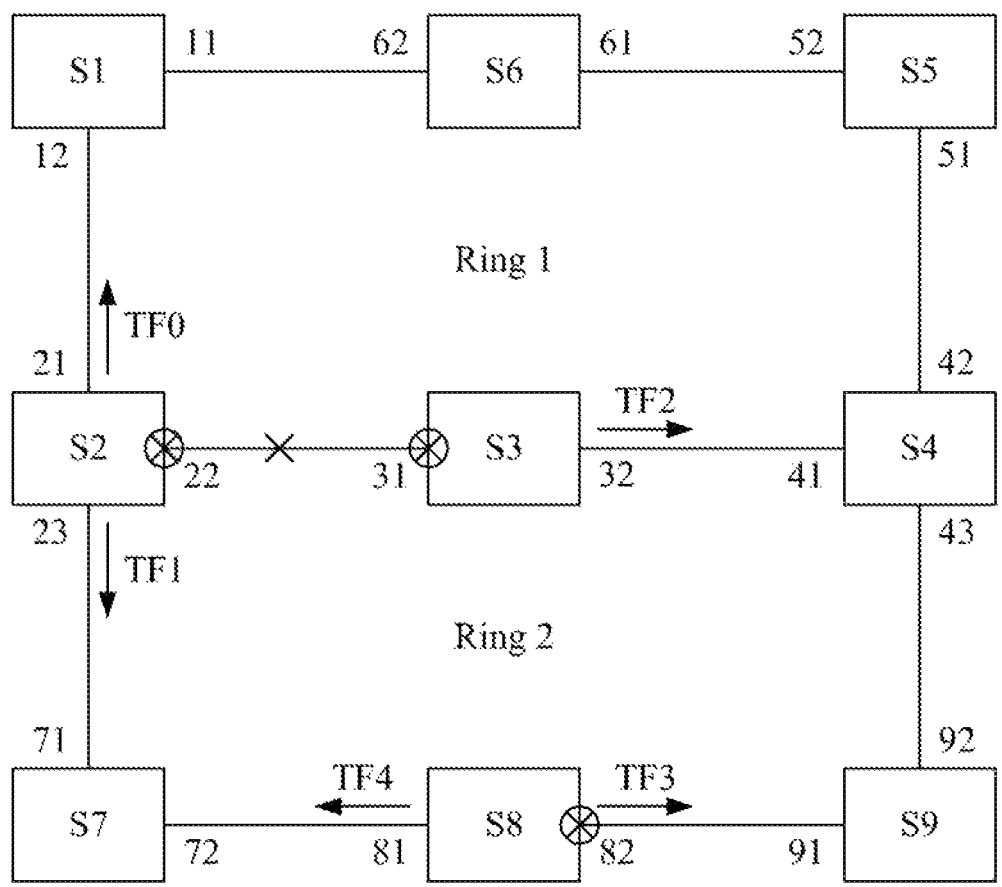
FIG. 7 is a schematic diagram of topology discovery in the case that a failure occurs in the multi-ring Ethernet according to the example of the present invention.

The present invention will be further illustrated in combination with FIG. 6 and FIG. 7. If the PID is identified by the blocked port, then a following problem might occur.

In the example 1 shown in FIG. 6, the topology information of the port 12 of the node S1 is:

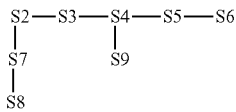

In the example 2 shown in FIG. 7, a failure occurs in the link <S2, S3>, and then the update process of the port 12 of the node S1 in example 2 is changed into that as follows.

When the port 12 of the node S1 firstly receives the TF0 message and finds that the (NODE_ID, PID) in the TF0 message is different from all the elements in its own set Ω, the node S1 adds the (NODE_ID, PID) in the TF0 message into the set Ω; the node S1 performs the maximum path match on the topology information "S2" of the NODE_LIST of the TF0 message with the tree topology of the port 12 (see the tree topology of the port 12 in example 1), and obtains the maximum match path "S2" and knows that the number of nodes included in the NODE_LIST is equal to that on the maximum match path; therefore, the topology information of the port 12 of the node S1 is changed into the "S2" rather than the "S2-S7-S8". Since the PID in the TF0 message uses the identifier of the blocked port (i.e., the port 22) of the node S2, the identifier of this blocked port will not be stored in the topology data structure of the port 12 of node S1, so that the node S1 does not know to delete which topology branch behind the node S2 in the topology information.

It can be seen from that that the PID in the present invention using the identifier of another node of the link connected with this blocked port to be represented solves the above problem very well.

In order to implement the above method for managing a topology of a multi-ring Ethernet, the present invention further provides a system for managing a topology of a multi-ring Ethernet, and this system is composed by a sending node and a receiving node in the multi-ring Ethernet.

The sending node includes a blocked port, and is configured to periodically send the TF message along the transmission control channel through its own good port, and if the port sending the TF message is not the blocked port, then the sending node writes its own NODE_ID into the NODE_LIST of the TF message; if the port sending the TF message is the blocked port, then the sending node does not write its own NODE_ID into the NODE_LIST of the TF message.

The receiving node is configured to receive the TF message, to update its own topology database according to the NODE_LIST in the TF message, and to forward the TF message along the transmission control channel after writing its own NODE_ID into the NODE_LIST of the TF message.

Preferably, the sending node is further configured to write its own NODE_ID into the NODE_LIST of the TF message when sending the TF message, and to write its own included PID into the PID field of the TF message.

The receiving node is further configured to judge whether the TF message is received from its own blocked port after receiving the TF message, and if yes, to discard the TF message; otherwise, to compare the NODE_ID and PID in the TF message with the NODE_ID and PID in its own set Ω, and if identical NODE_ID and PID exist, and then to forward the TF message along the transmission control channel after writing its own NODE_ID into the NODE_LIST of the TF message; if no identical NODE_ID and PID exist, to write the NODE_ID and PID in the TF message into its own set Ω, and to update its own topology database according to the NODE_LIST in the TF message, and then to forward the TF message along the transmission control channel after writing its own NODE_ID into the NODE_LIST of the TF message.

The receiving node is further configured to perform the maximum path match on the NODE_LIST in the TF message with the topology data structure corresponding to the port receiving the TF message;

when no maximum match path is found, the information of the NODE_LIST in the TF message is written into the topology data structure corresponding to the port receiving the TF message;

when the maximum match path is found and the number of nodes in the maximum match path is less than the number of nodes of the NODE_LIST in the TF message, the information of the NODE_LIST in the TF message is written into the topology data structure corresponding to the port receiving the TF message and the maximum match path is covered;

when the maximum match path is found and the number of nodes in the maximum match path is equal to the number of nodes of the NODE_LIST in the TF message, the NODE_ID which has the furthest distance with the port is searched in the NODE_LIST, and all the NODE_IDs behind the searched NODE_ID in the topology of the maximum match pat are deleted in the topology data structure corresponding to the port. The direction of deleting the identifiers of the nodes is the direction from the node which has the furthest distance to the port to a node identified by the PID field in said TF messag.

It should be noted that any node should have the dual functions of the above sending node and receiving node in the practical multi-ring Ethernet, and not only can implement the function of the sending node but also can implement the function of the receiving node in the appropriate scenarios.

The above description is only the preferred examples and is not intended to limit the protection scope of the present invention.

What is claimed is:
1. A method for managing a topology of a multi-ring Ethernet, comprising:
a node including a blocked port on the multi-ring Ethernet periodically sending Topology Find Frame (TF) messages along transmission control channels through ports of the node, wherein when the sending port is not the blocked port, said node writes its own Node Identifier (NODE_ID) into a Node identifier List (NODE_LIST) of the TF message, when the sending port is the blocked port, said node does not write its own NODE_ID into the NODE_LIST of the TF message;
a node receiving any of said TF messages in the multi-ring Ethernet updating the topology database of said receiving node according to the NODE_LIST in said TF message, writing its own NODE_ID into the NODE_LIST of said TF message, and then forwarding said TF message along the transmission control channel.

2. The method according to claim 1 further comprising: said sending node writing its own NODE_ID into a NODE_ID field of the TF messages, and writing its own blocked port identifier (PID) into a PID field of the TF messages.

3. The method according to claim 2 further comprising:
after receiving any of said TF messages, said receiving node judging whether the TF message is received through a blocked port of said receiving node, and if yes, discarding said TF message; if not, comparing the NODE_ID and the PID in said TF message with NODE_IDs and PIDs recorded in its own Ω set, wherein the Ω set includes information of the sending nodes in the multi-ring Ethernet, and the information includes the NODE_ID and the PID of the sending nodes, and if identical NODE_ID and PID exist in the Ω set, writing the NODE_ID of said receiving node into the NODE_LIST of said TF message, and then forwarding said TF message along the transmission control channel; if no identical NODE_ID and PID exist in the Ω set, writing the NODE_ID and PID in said TF message into the Ω set, updating its own topology database according to the NODE_LIST in said TF message, writing its own NODE_ID into the NODE_LIST of said TF message, and then forwarding said TF message along the transmission control channel.

4. The method according to claim 1, wherein said updating the topology database of said receiving node according to the NODE_LIST in said TF message comprises:
the receiving node performing maximum-path matching using the NODE_LIST in said TF message with a topology data structure associated with the receiving port in the topology database;
if no matched maximum-path is found, writing the information of the NODE_LIST inside said TF message into the topology data structure associated with the receiving port;
if the maximum-path is found and the number of nodes in said maximum-path is less than the number of nodes of the NODE_LIST in the TF message, writing information of the NODE_LIST inside said TF message into the topology data structure associated with the receiving port, and overwriting the maximum-path;
if the maximum-path is found and the number of nodes in said maximum-path is equal to the number of nodes of the NODE_LIST in the TF message, searching the NODE_ID which has the furthest distance with said receiving port in said NODE_LIST, and deleting all NODE_IDs that are after the searched NODE_ID in the topology having said maximum-path in the topology data structure associated with the receiving port, wherein the direction for deleting the NODE_IDs is the direction from said searched NODE_ID to the node identified by the PID field in said TF message.

5. A system for managing a topology of a multi-ring Ethernet comprising a sending node and a receiving node in the multi-ring Ethernet, wherein:
said sending node includes a blocked port, and is configured to periodically send Topology Find Frame (TF) messages along transmission control channels through ports of the sending node, wherein when the sending port is not the blocked port, said sending node writes its own Node Identifier (NODE_ID) into a Node identifier List (NODE_LIST) of the TF message, when the sending port is the blocked port, said sending node does not write its own NODE_ID into the NODE_LIST of the TF message;
said receiving node is configured to, when receiving any of said TF messages, to update the topology database of said receiving node according to the NODE_LIST in said TF message, to write its own NODE_ID into the NODE_LIST of said TF message, and then to forward said TF message along the transmission control channel.

6. The system according to claim 5, wherein said sending node is further configured to: write its own NODE_ID into a NODE_ID field of the TF messages, and write its own blocked port identifier (PID) into a PID field of the TF messages.

7. The system according to claim 6, wherein:
said receiving node is further configured to: after receiving any of said TF messages, judge whether the TF message is received through an blocked port of said receiving node, and if yes, discard said TF message; if not, compare the NODE_ID and the PID in said TF message with NODE_IDs and PIDs recorded in its own Ω set, wherein the Ω set includes information of the sending nodes in the multi-ring Ethernet, and the information includes the NODE_ID and the PID of the sending nodes, and if identical NODE_ID and PID exist in the Ω set, write the NODE_ID of said receiving node into the NODE_LIST of said TF message, and then forward said TF message along the transmission control channel; if no identical NODE_ID and PID exist in the Ω set, write the NODE_ID and PID in said TF message into the Ω set, update its own topology database according to the NODE_LIST in said TF message, write its own NODE_ID into the NODE_LIST of said TF message, and then forward said TF message along the transmission control channel.

8. The system according to claim 5, wherein said receiving node is further configured to: perform maximum-path matching using the NODE_LIST in said TF message with a topology data structure associated with the receiving port in the topology database;
if no matched maximum-path is found, write the information of the NODE_LIST inside said TF message into the topology data structure associated with the receiving port;
if the maximum-path is found and the number of nodes in said maximum-path is less than the number of nodes of the NODE_LIST in the TF message, write information inside said TF message into the topology data structure associated with the receiving port, and overwrite the maximum-path;
if the maximum-path is found and the number of nodes in said maximum-path is equal to the number of nodes of the NODE_LIST in the TF message, search the NODE_ID which has the furthest distance with said receiving port in said NODE_LIST, and delete all NODE_IDs that are after the searched NODE_ID in the topology having said maximum-path in the topology data structure associated with the receiving port, wherein the direction for deleting the NODE_IDs is the direction from said searched NODE_ID to the node identified by the PID field in said TF message.

9. The method according to claim 2, wherein said updating the topology database of said receiving node according to the NODE_LIST in said TF message comprises:
the receiving node performing maximum-path matching using the NODE_LIST in said TF message with a topology data structure associated with the receiving port in the topology database;
if no matched maximum-path is found, writing the information of the NODE_LIST inside said TF message into the topology data structure associated with the receiving port;
if the maximum-path is found and the number of nodes in said maximum-path is less than the number of nodes of the NODE_LIST in the TF message, writing information of the NODE_LIST inside said TF message into the topology data structure associated with the receiving port, and overwriting the maximum-path;

if the maximum-path is found and the number of nodes in said maximum-path is equal to the number of nodes of the NODE_LIST in the TF message, searching the NODE_ID which has the furthest distance with said receiving port in said NODE_LIST, and deleting all NODE_IDs that are after the searched NODE_ID in the topology having said maximum-path in the topology data structure associated with the receiving port, wherein the direction for deleting the NODE_IDs is the direction from said searched NODE_ID to the node identified by the PID field in said TF message.

10. The method according to claim 3, wherein said updating the topology database of said receiving node according to the NODE_LIST in said TF message comprises:

the receiving node performing maximum-path matching using the NODE_LIST in said TF message with a topology data structure associated with the receiving port in the topology database;

if no matched maximum-path is found, writing the information of the NODE_LIST inside said TF message into the topology data structure associated with the receiving port;

if the maximum-path is found and the number of nodes in said maximum-path is less than the number of nodes of the NODE_LIST in the TF message, writing information of the NODE_LIST inside said TF message into the topology data structure associated with the receiving port, and overwriting the maximum-path;

if the maximum-path is found and the number of nodes in said maximum-path is equal to the number of nodes of the NODE_LIST in the TF message, searching the NODE_ID which has the furthest distance with said receiving port in said NODE_LIST, and deleting all NODE_IDs that are after the searched NODE_ID in the topology having said maximum-path in the topology data structure associated with the receiving port, wherein the direction for deleting the NODE_IDs is the direction from said searched NODE_ID to the node identified by the PID field in said TF message.

11. The system according to claim 6, wherein said receiving node is further configured to: perform maximum-path matching using the NODE_LIST in said TF message with a topology data structure associated with the receiving port in the topology database;

if no matched maximum-path is found, write the information of the NODE_LIST inside said TF message into the topology data structure associated with the receiving port;

if the maximum-path is found and the number of nodes in said maximum-path is less than the number of nodes of the NODE_LIST in the TF message, write information inside said TF message into the topology data structure associated with the receiving port, and overwrite the maximum-path;

if the maximum-path is found and the number of nodes in said maximum-path is equal to the number of nodes of the NODE_LIST in the TF message, search the NODE_ID which has the furthest distance with said receiving port in said NODE_LIST, and delete all NODE_IDs that are after the searched NODE_ID in the topology having said maximum-path in the topology data structure associated with the receiving port, wherein the direction for deleting the NODE_IDs is the direction from said searched NODE_ID to the node identified by the PID field in said TF message.

12. The system according to claim 7, wherein said receiving node is further configured to: perform maximum-path matching using the NODE_LIST in said TF message with a topology data structure associated with the receiving port in the topology database;

if no matched maximum-path is found, write the information of the NODE_LIST inside said TF message into the topology data structure associated with the receiving port;

if the maximum-path is found and the number of nodes in said maximum-path is less than the number of nodes of the NODE_LIST in the TF message, write information inside said TF message into the topology data structure associated with the receiving port, and overwrite the maximum-path;

if the maximum-path is found and the number of nodes in said maximum-path is equal to the number of nodes of the NODE_LIST in the TF message, search the NODE_ID which has the furthest distance with said receiving port in said NODE_LIST, and delete all NODE_IDs that are after the searched NODE_ID in the topology having said maximum-path in the topology data structure associated with the receiving port, wherein the direction for deleting the NODE_IDs is the direction from said searched NODE_ID to the node identified by the PID field in said TF message.

* * * * *